(12) United States Patent
Zwaag

(10) Patent No.: US 11,873,943 B2
(45) Date of Patent: *Jan. 16, 2024

(54) MINERAL WOOL PRODUCT

(71) Applicant: ROCKWOOL INTERNATIONAL A/S, Hedehusene (DK)

(72) Inventor: Claudia Zwaag, Hedehusene (DK)

(73) Assignee: Rockwool International A/S, Hedehusene (DK)

(*) Notice: Subject to any disclaimer, the term of this patent is extended or adjusted under 35 U.S.C. 154(b) by 0 days.

This patent is subject to a terminal disclaimer.

(21) Appl. No.: 17/969,546

(22) Filed: Oct. 19, 2022

(65) Prior Publication Data

US 2023/0053957 A1 Feb. 23, 2023

Related U.S. Application Data

(63) Continuation of application No. 17/110,531, filed on Dec. 3, 2020, now Pat. No. 11,519,547, which is a continuation of application No. 15/690,964, filed on Aug. 30, 2017, now Pat. No. 10,920,920.

(51) Int. Cl.

| F16L 59/02 | (2006.01) |
| C08K 7/04 | (2006.01) |
| C03C 25/40 | (2006.01) |
| E04B 1/74 | (2006.01) |
| F16L 59/04 | (2006.01) |
| C08G 77/18 | (2006.01) |

(52) U.S. Cl.
CPC ............ F16L 59/026 (2013.01); C03C 25/40 (2013.01); C08K 7/04 (2013.01); E04B 1/74 (2013.01); F16L 59/022 (2013.01); C08G 77/18 (2013.01); F16L 59/028 (2013.01); F16L 59/04 (2013.01)

(58) Field of Classification Search
CPC ........ F16L 59/028; F16L 59/022; C08K 7/04; E04B 1/74; C08G 77/18
See application file for complete search history.

(56) References Cited

U.S. PATENT DOCUMENTS

| 3,702,798 A * | 11/1972 | Richard ................. D04H 1/587 |
| | | 525/509 |
| 10,920,920 B2 * | 2/2021 | Zwaag ..................... C08K 7/04 |
| 11,519,547 B2 * | 12/2022 | Zwaag ..................... C08K 7/04 |
| 2007/0027283 A1 | 2/2007 | Swift et al. |
| 2010/0175826 A1 | 7/2010 | Huenig et al. |
| 2011/0190425 A1 | 8/2011 | Swift |
| 2012/0070645 A1 | 3/2012 | Jaffrennou et al. |
| 2012/0168054 A1 * | 7/2012 | Chen ...................... C03C 25/40 |
| | | 427/256 |
| 2014/0186635 A1 | 7/2014 | Mueller |
| 2014/0364029 A1 * | 12/2014 | Hawkins ................ C09J 105/06 |
| | | 106/217.7 |
| 2016/0185950 A1 | 6/2016 | Swift |
| 2021/0163783 A1 | 6/2021 | Zwaag |

FOREIGN PATENT DOCUMENTS

| CN | 104402211 A | 3/2015 |
| CS | 249737 B1 | 4/1987 |
| EP | 2230222 A1 | 9/2010 |
| JP | 2003119656 A | 4/2003 |
| WO | 2008127936 A2 | 10/2008 |
| WO | 2016102444 A1 | 6/2016 |

OTHER PUBLICATIONS

U.S. Appl. No. 15/690,964, "Final Office Action", dated Jul. 15, 2020, 8 pages.
U.S. Appl. No. 15/690,964, "Non-Final Office Action", dated Jan. 27, 2020, 13 pages.
U.S. Appl. No. 15/690,964, "Notice of Allowance", dated Oct. 23, 2020, 5 pages.
U.S. Appl. No. 16/641,482, "Non-Final Office Action", dated Sep. 29, 2022, 8 pages.
U.S. Appl. No. 16/641,488, "Non-Final Office Action", dated Sep. 2, 2022, 9 pages.
U.S. Appl. No. 17/110,531, "Final Office Action", dated Apr. 6, 2022, 10 pages.
U.S. Appl. No. 17/110,531, "Non-Final Office Action", dated Sep. 21, 2021, 13 pages.
U.S. Appl. No. 17/110,531, "Notice of Allowance", dated Jul. 20, 2022, 5 pages.
International Application No. PCT/EP2018/073268, "International Search Report and Written Opinion", dated Sep. 19, 2018, 16 pages.
International Application No. PCT/EP2018/073273, "International Search Report and Written Opinion", dated Sep. 27, 2018, 11 pages.

* cited by examiner

*Primary Examiner* — C Melissa Koslow
(74) *Attorney, Agent, or Firm* — Mintz Levin Cohn Ferris Glovsky and Popeo, P.C.

(57) ABSTRACT

A mineral wool product comprises mineral fibers bound by a binder resulting from the curing of a binder composition comprising a phenol-formaldehyde-based resin, and/or a carbohydrate containing component; a hydrophobic agent comprising (i) at least one silicone compound, such as silicone resin; (ii) at least one hardener, such as silane; (iii) optionally, at least one emulsifier; as insulation of a metallic structure, said structure having an operating temperature between 0-650° C.

20 Claims, 5 Drawing Sheets

MINERAL WOOL PRODUCT

REFERENCE TO RELATED APPLICATION

This application is a continuation of U.S. application Ser. No. 17/110,531, filed Dec. 3, 2020, now U.S. Pat. No. 11,519,547, issued Dec. 6, 2022, and entitled MINERAL WOOL PRODUCT PREPARED WITH A BINDER CONTAINING A HYDROPHOBIC AGENT, which is a continuation application of U.S. application Ser. No. 15/690,964, filed Aug. 30, 2017, now U.S. Pat. No. 10,920,920, issued Feb. 16, 2021, entitled USE OF A MINERAL WOOL PRODUCT, the content of which hereby incorporated by this reference in their entireties.

FIELD OF THE INVENTION

The present invention relates to the use of a mineral wool product comprising mineral fibers bound by a binder resulting from the curing of a binder composition comprising a hydrophobic agent comprising at least one silicone compound at least one hardener and at least one emulsifier, as insulation of a metallic structure. The present invention is also directed to a binder composition for mineral fibers comprising such a hydrophobic agent, a mineral wool product comprising mineral fibers bound by a binder resulting from the curing of such a binder composition and a method for producing a mineral wool product which comprises the steps of contacting mineral fibers with such a binder composition.

BACKGROUND OF THE INVENTION

Corrosion is the deterioration of a metal as result of a chemical reaction between it and the surrounding environment. Corrosion involves the conversion of the metal to a more chemically stable form, such as oxide, hydroxide or sulfide.

Corrosion of steel occurs in the presence of water and oxygen. Corrosion of steel parts is a major economic problem which often times makes up a major part of the maintenance and renewal costs of steel structures.

A very specific problem is the problem of corrosion under insulation (CUI) which affects steel parts which are thermally isolated by an insulating material. Steel structures are often insulated in order to avoid heat loss. Such a thermal insulation might be desirable for steel structures which are much warmer or colder than their surrounding environment. CUI occurs in particular under insulation for steel structures which undergo cyclic temperature changes like e.g. pipelines in the oil and gas industry.

Since corrosion of steel occurs in the presence of water and oxygen, the presence of water in contact with the steel structure is a major factor contributing to corrosion. Since thermal insulation materials surrounding the steel structures in order to avoid heat loss tend to keep water in contact with the steel structure for a longer time than the contact would last without the surrounding insulating material, such insulating materials can contribute to increased corrosion. Steels are in general susceptible to CUI in the temperature range of 0° C. to 175° C. The most frequently occurring types of CUI are general and pitting corrosion of carbon steel which may occur if wet insulation comes in contact with carbon steel, and external stress corrosion tracking (ESCT) of austenitic stainless steel, which is a specific type of corrosion mainly caused by the action of water-soluble chloride from rain water or if the insulation is not meeting the appropriate requirements. Since the corroded surface is mostly hidden by the insulation system and will not be observed until the insulation is removed for inspection or in the event of metal failure leading to incidents, it is very important to control CUI as much as possible.

In order to avoid CUI, the insulated steel structures are often covered by an additional cladding which is to prevent the entering of water. However, experience shows that water often enters via fault or damages in the cladding system or via humid air in structures which undergo cyclic temperature changes. Water may also come into contact with the steel structure internally from non-tight fittings or externally from events like flooding.

In order to avoid CUI, steel structures like pipelines in the oil and gas industries are often protected against corrosion by coating the steel parts with a protective layer, e.g. with other metals like zinc or aluminum. However, such coating layers are never a completely protecting layer and these protective measures can be extremely cost-intensive and might be economically unacceptable for extensive pipeline systems.

There have been previous attempts to use mineral wool products as insulation of metallic structures and still protect them from CUI. The most common way to reduce CUI is by use of a mineral wool product prepared from a mineral wool binder to which a mineral oil has been added. By adding mineral oil, the water repellent requirements according to EN13472 can be met. However, for these mineral wool products, the inhibition of CUI is still not satisfactory, because the water absorption is still too high. In addition, these mineral wool products used as insulation materials suffer from the disadvantage that when exposed to higher temperatures, the water absorbance quickly raises to unacceptable levels. This is in particular a problem for the use of such insulation materials for insulating pipelines in the oil and gas industry since in these pipelines operating temperatures often exceed 150° C. Under these conditions, the water repellent properties of these insulation materials are quickly lost.

The problems associated with CUI can be so serious, that some companies choose to avoid thermal insulation of pipelines even though this leads to a highly energy-inefficient operation.

In view of the foregoing, it would be advantageous to have available an insulation of a metallic structure that allows effective thermal insulation of such a structure and at the same time minimizes maintenance costs and optimizes durability of the structure.

In particular, it would be advantageous to have available an insulation of a metallic structure that allows effective thermal insulation of such a structure and at the same time minimizes corrosion of the metallic structure.

It would further be advantageous to have available a binder composition for mineral fibers which allows the production of a mineral wool product for such purposes.

It would further be advantageous to have available a mineral wool product prepared with such a binder composition.

It would further be advantageous to have available a method of making such a mineral wool product.

SUMMARY OF THE INVENTION

In accordance with a first aspect of the present invention, there is provided the use of a mineral wool product comprising mineral fibers bound by a binder resulting from the curing of a binder composition comprising a phenol-formaldehyde-based resin, and/or a carbohydrate containing component, a hydrophobic agent comprising (i) at least one silicone compound, such as silicone resin, such as a reactive silicone resin, such as a reactive silicone resin chosen from the group of polyalkylethoxysiloxane, polymethylethoxysiloxane, polyphenylethoxysiloxane, polyphenylsiloxane, polyphenylmethylsiloxane, (ii) at least one hardener, such as silane, such as alkyltriethoxysilane, such as octyltriethoxysilane, (iii) optionally, at least one emulsifier (which preferably is present), as insulation of a metallic structure, said structure having an operating temperature between 0-650° C., such as between 25-500° C., such as between 70-300° C., such as between 300-650° C.

In accordance with a second aspect of the present invention, there is provided a binder composition for mineral fibers comprising a phenol-formaldehyde-based resin, and/or a carbohydrate-containing component, and a hydrophobic agent comprising (i) at least one silicone compound, such as silicone resin, such as a reactive silicone resin, such as a reactive silicone resin chosen from the group of polyalkylethoxysiloxane, polymethylethoxysiloxane, polyphenylethoxysiloxane, polyphenylsiloxane, polyphenylmethylsiloxane, (ii) at least one hardener, such as silane, such as alkyltriethoxysilane, such as octyltriethoxysilane, (iii) optionally, at least one emulsifier.

In accordance with a third aspect of the present invention, there is provided a mineral wool product comprising mineral fibers bound by a binder resulting from the curing of a binder composition comprising a phenol-formaldehyde-based resin, and/or a carbohydrate-containing component, a hydrophobic agent comprising (i) at least one silicone compound, such as silicone resin, such as a reactive silicone resin, such as a reactive silicone resin chosen from the group of polyalkylethoxysiloxane, polymethylethoxysiloxane, polyphenyl-ethoxysiloxane, polyphenylsiloxane, polyphenylmethylsiloxane, (ii) at least one hardener, such as silane, such as alkyltriethoxysilane, such as octyltriethoxysilane, (iii) optionally, at least one emulsifier.

In accordance with a fourth aspect of the present invention, there is provided a method for producing a mineral wool product which comprises the steps of contacting mineral fibers with a binder composition comprising a phenol-formaldehyde-based resin, and/or a carbohydrate-containing component, and a hydrophobic agent comprising (i)
at least one silicone compound, such as silicone resin, such as a reactive silicone resin, such as a reactive silicone resin chosen from the group of polyalkylethoxysiloxane, polymethylethoxysiloxane, polyphenylethoxysiloxane, polyphenyl siloxane, polyphenylmethylsiloxane, (ii) at least one hardener, such as silane, such as alkyltriethoxysilane, such as octyltriethoxysilane, (iii) optionally, at least one emulsifier.

The present inventors have surprisingly found that a very specific hydrophobic agent or composition can impart properties to a mineral wool binder which allow the use of a mineral wool product prepared from mineral fibers bound by such a binder as an insulation of a metallic structure and at the same time avoid problems with corrosion under insulation, associated with previously-known insulation products.

BRIEF DESCRIPTION OF THE DRAWINGS

In the accompanying drawings.

DESCRIPTION OF THE EMBODIMENTS OF THE INVENTION

Figure 1:
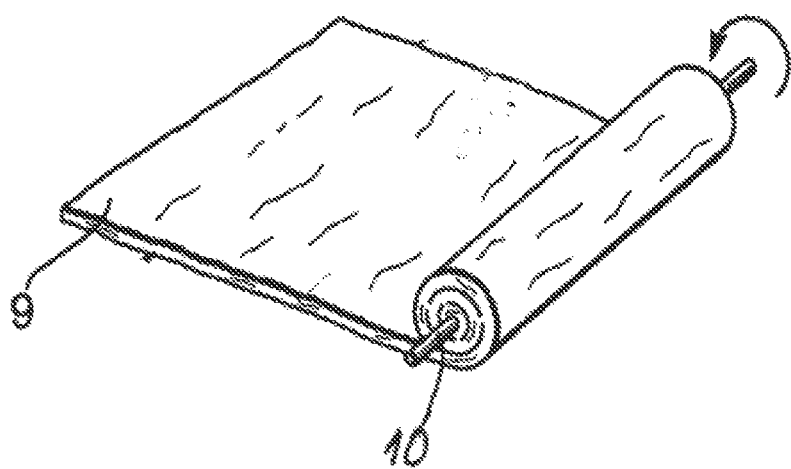
FIG. 1 shows a mandrel pipe section in the process of being manufactured.

The present invention is directed to a use of a mineral wool product comprising mineral fibers bound by a binder resulting from the curing of a binder composition comprising a phenol-formaldehyde-based resin, and/or a carbohydrate containing component, a hydrophobic agent or composition comprising (i) at least one silicone compound, such as silicone resin, such as a reactive silicone resin, such as a reactive silicone resin chosen from the group of polyalkylethox-ysiloxane, polymethylethoxysiloxane, polyphenylethoxy-siloxane, polyphenyl-siloxane, polyphenylmethylsiloxane, (ii) at least one hardener, such as silane, such as alkyltriethoxysilane, such as octyltriethoxysilane, (iii) optionally, at least one emulsifier, as insulation of a metallic structure, said structure having an operating temperature between 0-650° C., such as between 25-500° C., such as between 70-300° C., such as between 300-650° C.

Hydrophobic Agent

The present inventors have surprisingly found that by the use of the very specific hydrophobic agent described herein, corrosion problems in form of corrosion under insulation can be avoided. Without wanting to be bound to any specific theory, the present inventors assume that the corrosion problems associated with the previously-known use of insulation elements for metal structures are connected to the so-called wicking-effect of such insulation products. This wicking effect of the insulation products causes moisture, once it has entered the system, to be retained for a prolonged period of time at the surface of the metal structure. Accordingly, such insulation materials prolong the time during which the surface of the metal structure is kept in contact with water which contributes to an increased rate of corrosion, in particular at higher temperatures Without wanting to be bound to any specific theory the present inventors assume that the use of the very specific hydrophobic agent described herein allows a quicker dry out time which allows an inhibition of corrosion.

It has now surprisingly been found that by use of mineral wool products prepared from a binder containing the hydrophobic agent described herein, excellent insulation characteristics can be attained while at the same time the corrosion under insulation is effectively inhibited.

In one embodiment, the hydrophobic agent comprises component (i) in an amount of 20 to 90 percent by weight, in particular 30 to 60 percent by weight, based on the weight of the hydrophobic agent.

In one embodiment, the hydrophobic agent comprises component (i) in form of polymethylethoxysiloxane.

In one embodiment, the hydrophobic agent comprises component (ii) in an amount of 0.5 to 10 percent by weight, in particular 1 to 5 percent by weight, based on the total weight of the hydrophobic agent.

In one embodiment, the hydrophobic agent comprises component (ii) in form of octyltriethoxysilane.

In an alternative embodiment, the silicone compound, component (i), also serves as the hardener component (ii) of the hydrophobic agent. Accordingly, in this alternative embodiment, the hydrophobic agent comprises at least one silicone compound, such as silicone resin, such as a reactive silicone resin, such as a reactive silicone resin chosen from the group of polyalkylethoxysiloxane, polymethylethoxysiloxane, polyphenylethoxysiloxane, polyphenylsiloxane, polyphenylmethylsiloxane, and at least one emulsifier.

Accordingly, in one embodiment, the hardener is another compound than the silicone compound. In an alternative embodiment, the hardener is comprised in the silicone compound as a curable system. In this alternative embodiment, the hardener may be the feature that is effected by an intra-molecular hardening of the silicone compound.

In one embodiment, the hydrophobic agent comprises (i) in an amount of 30 to 60 percent by weight, (ii) in an amount of 1 to 5 percent by weight, based on the total weight of the hydrophobic agent, the remainder being (iii) and optionally other components and trace amounts of ethanol.

In one embodiment, the hydrophobic agent comprises polymethylethoxysiloxane in an amount of 30 to 60 percent by weight, octyltriethoxysilane in an amount of 1 to 5 percent by weight, based on the total weight of the hydrophobic agent, the remainder being (iii) and optionally other components and trace amounts of ethanol.

In one embodiment, the binder composition comprises the hydrophobic agent in an amount of 0.05 to 2 percent by weight, such as 0.10 to 1 percent by weight, such as 0.15 to 0.8 percent by weight, based on the weight of the aqueous binder composition mineral wool product.

In one embodiment, the binder composition comprises a carbohydrate-containing binder component, wherein the binder component further comprises (a) a polycarboxylic acid component or any salt thereof and/or an inorganic acid or any salt thereof, and/or (b) a component selected from the group consisting of amine compounds, ammonia; and optionally, and/or (c) a reaction product of a polycarboxylic acid component or anhydride thereof and an alkanolamine component.

In one embodiment, the mineral wool product is a pipe section or a mat or wired mat.

Binder Composition

The present invention is also directed to a binder composition for mineral fibers comprising: a phenol-formaldehyde-based resin, and/or a carbohydrate-containing component; and a hydrophobic agent comprising: (i) at least one silicone compound, such as silicone resin, such as a reactive silicone resin, such as a reactive silicone resin chosen from the group of polyalkylethoxysiloxane, polymethylethoxysiloxane, polyphenylethoxysiloxane, polyphenylsiloxane, polyphenylmethylsiloxane, (ii) at least one hardener, such as silane, such as alkyltriethoxysilane, such as octyltriethoxysilane, (iii) optionally, at least one emulsifier (preferably, at least one emulsifier is present).

This binder composition, which comprises a specific hydrophobic agent, allows the production of mineral wool products which can be used as insulation of a metallic structure having very good insulation characteristics and at the same time allows the inhibition of corrosion under insulation.

In one embodiment, the hydrophobic agent comprises component (i) in an amount of 20 to 90 percent by weight, in particular 30 to 60 percent by weight, based on the weight of the hydrophobic agent.

In one embodiment, the hydrophobic agent comprises component (i) in form of polymethylethoxysiloxane.

In one embodiment, the hydrophobic agent comprises component (ii) in an amount of 0.5 to 10 percent by weight, in particular 1 to 5 percent by weight, based on the total weight of the hydrophobic agent.

In one embodiment, the hydrophobic agent comprises component (ii) in form of octyltriethoxysilane.

In an alternative embodiment, the silicone compound component (i) also serves as the hardener component (ii) of the hydrophobic agent. Accordingly, in this alternative embodiment, the hydrophobic agent comprises at least one silicone compound, such as silicone resin, such as a reactive silicone resin, such as a reactive silicone resin chosen from the group of polyalkylethoxysiloxane, polymethylethoxysiloxane, polyphenylethoxysiloxane, polyphenylsiloxane, polyphenylmethylsiloxane, and at least one emulsifier.

Accordingly, in one embodiment, the hardener is a compound which is different from the silicone compound. In an alternative embodiment, the hardener is comprised in the silicone compound as a curable system. In this alternative embodiment, the hardener may be the feature that is effected by an intra-molecular hardening of the silicone compound.

In one embodiment, the hydrophobic agent comprises component (i) in an amount of 30 to 60 percent by weight, component (ii) in an amount of 1 to 5 percent by weight, based on the total weight of the hydrophobic agent, the remainder being (iii) and optionally other components and trace amounts of ethanol.

In one embodiment, the hydrophobic agent comprises polymethylethoxysiloxane in an amount of 30 to 60 percent by weight, octyltriethoxysilane in an amount of 1 to 5 percent by weight, based on the total weight of the hydrophobic agent, the remainder being (iii) and optionally other components and trace amounts of ethanol.

Mineral Wool Product

The mineral fibers employed for the production of the mineral wool products may be any of man-made vitreous fibers (MMVF), glass fibers, ceramic fibers, basalt fibers, slag fibers, stone fibers and others. These fibers may be present as a wool product, e.g. like a stone wool product.

The present invention is directed to a mineral wool product comprising mineral fibers bound by a binder resulting from the curing of a binder composition comprising a phenol-formaldehyde-based resin, and/or a carbohydrate-containing component, a hydrophobic agent comprising: (i) at least one silicone compound, such as silicone resin, such as a reactive silicone resin, such as a reactive silicone resin chosen from the group of polyalkylethoxysiloxane, polymethylethoxysiloxane, polyphenyl ethoxysiloxane, polyphenylsiloxane, polyphenylmethylsiloxane, (ii) at least one hardener, such as silane, such as alkyltriethoxysilane, such as octyltriethoxysilane, (iii) optionally, at least one emulsifier.

In one embodiment, the hydrophobic agent comprises component (i) in an amount of 20 to 90 percent by weight, in particular 30 to 60 percent by weight, based on the weight of the hydrophobic agent.

In one embodiment, the hydrophobic agent comprises component (i) in form of polymethylethoxysiloxane.

In one embodiment, the hydrophobic agent comprises component (ii) in an amount of 0.5 to 10 percent by weight, in particular 1 to 5 percent by weight, based on the total weight of the hydrophobic agent.

In one embodiment, the hydrophobic agent comprises (ii) in form of octyltriethoxysilane.

In an alternative embodiment, the silicone compound component (i) also serves as the hardener component (ii) of the hydrophobic agent. Accordingly, in this alternative embodiment, the hydrophobic agent comprises at least one silicone compound, such as silicone resin, such as a reactive silicone resin, such as a reactive silicone resin chosen from the group of polyalkylethoxysiloxane, polymethylethoxysiloxane, polyphenylethoxysiloxane, polyphenylsiloxane, polyphenylmethylsiloxane, and optionally, at least one emulsifier.

Accordingly, in one embodiment, the hardener is another compound than the silicone compound. In an alternative embodiment, the hardener is comprised in the silicone compound as a curable system. In this alternative embodiment, the hardener may be the feature that is effected by an intra-molecular hardening of the silicone compound.

In one embodiment, the hydrophobic agent comprises (i) in an amount of 30 to 60 percent by weight, (ii) in an amount of 1 to 5 percent by weight, based on the total weight of the hydrophobic agent, the remainder being (iii) and optionally other components and trace amounts of ethanol.

In one embodiment, the hydrophobic agent comprises polymethylethoxysiloxane in an amount of 30 to 60 percent by weight, octyltriethoxysilane in an amount of 1 to 5 percent by weight, based on the total weight of the hydrophobic agent, the remainder being (iii) and optionally other components and trace amounts of ethanol.

In one embodiment, the mineral wool product comprises the hydrophobic agent in an amount of 0.05 to 2 percent by weight, such as 0.10 to 1 percent by weight, such as 0.15 to 0.8 percent by weight, based on the weight of the mineral wool product.

In one embodiment, the binder composition comprises a carbohydrate-containing binder component, wherein the binder composition further comprises (a) a polycarboxylic acid component or any salt thereof and/or an inorganic acid or any salt thereof, and/or (b) a component selected from the group consisting of amine compounds, ammonia; and optionally, and/or (c) a reaction product of a polycarboxylic acid component or anhydride thereof and an alkanolamine component.

In one embodiment the mineral wool product is in form of an insulation product for thermal insulation of metallic structures.

In one embodiment the mineral wool product is in form of a pipe section or a mat or wired mat.

Pipe sections are pre-formed (formed in the factory) insulation materials used for the insulation around pipes.

A typical embodiment of such a pipe section is a mandrel wound pipe section.

A mandrel wound pipe section is a pre-formed, full-round cylindrical pipe insulation product which is produced by wrapping an uncured mineral wool blanket around a mandrel in spiral manner for forming and subsequent curing. The cylindrical pipe sections are split and hinged for easy snap-on assembly. Mandrel wound pipe sections can be both faced and un-faced with aluminum foil.

FIG. 1 shows how such a mandrel wound pipe section is typically produced. In this method the pipe section is wound from a thin web 9 of mineral wool, preferably stone wool. The web 9 is wound around a perforated mandrel 10 as it is known when producing wound pipe sections. After winding hot air is conventionally blown from inside the mandrel and through the wound pipe section for curing of the thermoset binder.

Figure 2:
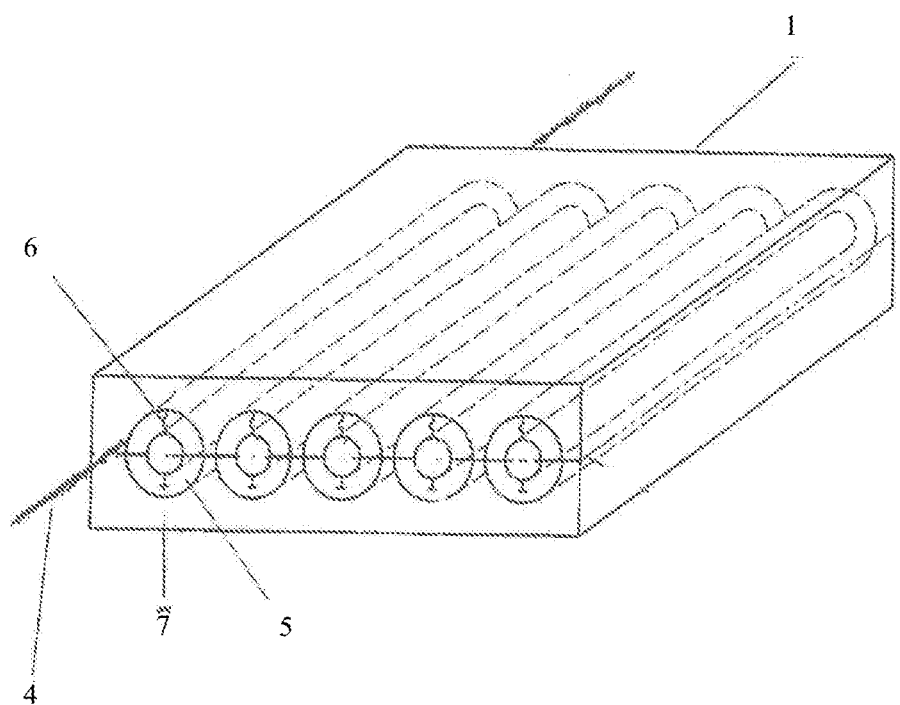
FIG. 2 illustrates a block of bonded mineral wool and a cutting string by means of which pipe sections are cut out of the block.

An alternative embodiment of a pre-formed pipe section is shown in FIG. 2.

FIG. 2 illustrates a block (1) of bonded mineral wool and a cutting string (4) by means of which pipe sections (5) having a tongue/groove-joint (6) and a T-shaped hinge slit (7) are cut out of the block in the transverse direction of the block and parallel to the main surface planes of the block. After cutting out each pipe section 5 is removed from the block.

Figure 3:
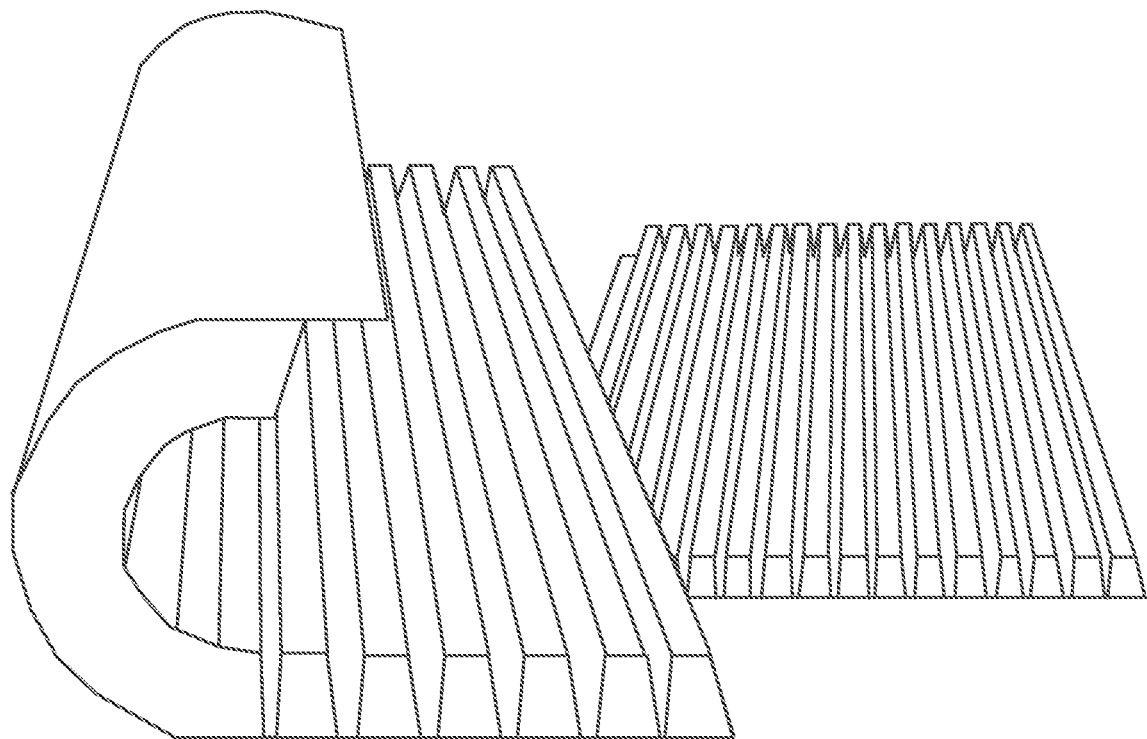
FIG. 3 shows a pipe insulation in the form of a mat of mineral wool provided with transversally extending V-grooves.

A further embodiment of a pipe insulation is shown in FIG. 3 which shows a mat of mineral wool provided with transversally extending V-grooves. Due to the V-grooves the mat can be wrapped around a pipe on site as indicated in the version shown at the front in FIG. 3.

Figure 4:
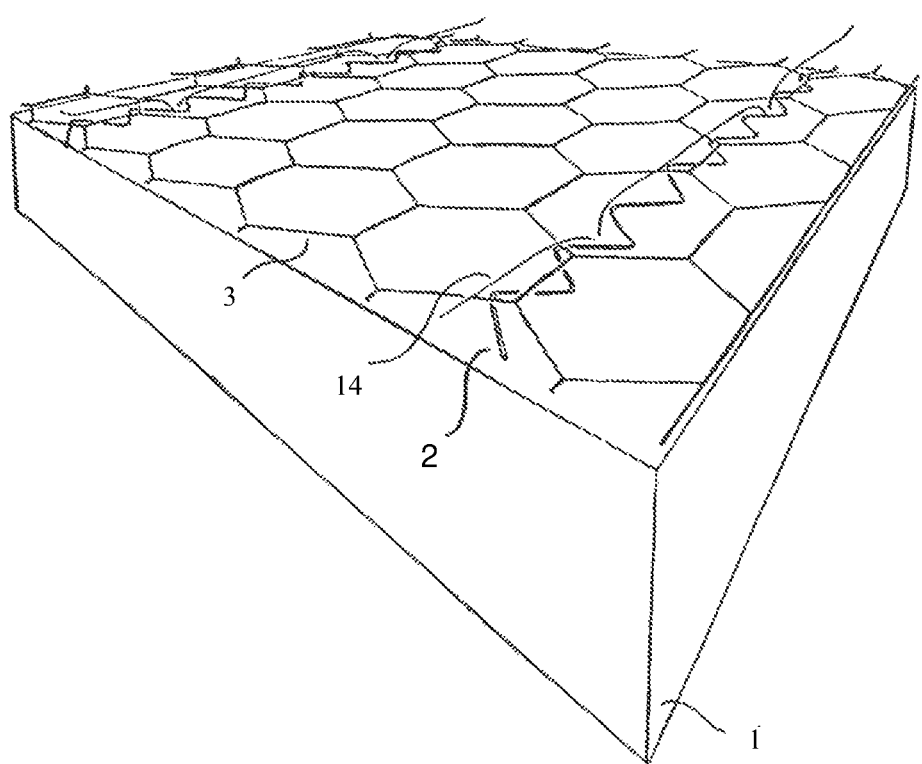
FIG. 4 illustrates in perspective view a wired mat according to the invention where an insulation layer is provided with a chicken wire.

An alternative embodiment is a mineral wool product in form of a wired mat. FIG. 4 is an illustration of such a wired mat.

FIG. 4 illustrates in perspective view such a wired mat according to the invention where an insulation layer 1 in terms of a mineral fiber web is provided with a chicken wire 3 which is fastened to the insulating layer 1 by means of an iron thread 14 stitched through the insulating layer. A fixation means 2 in terms of a galvanized iron wire may be in zigzag configuration and placed under the chicken wire 3. In an alternative embodiment, no such fixation means are included.

In a further alternative embodiment, mats are used without any wiring. In this alternative embodiment, the mineral wool product is in form of a mineral wool mat—sometimes also called a slab.

Figure 5:
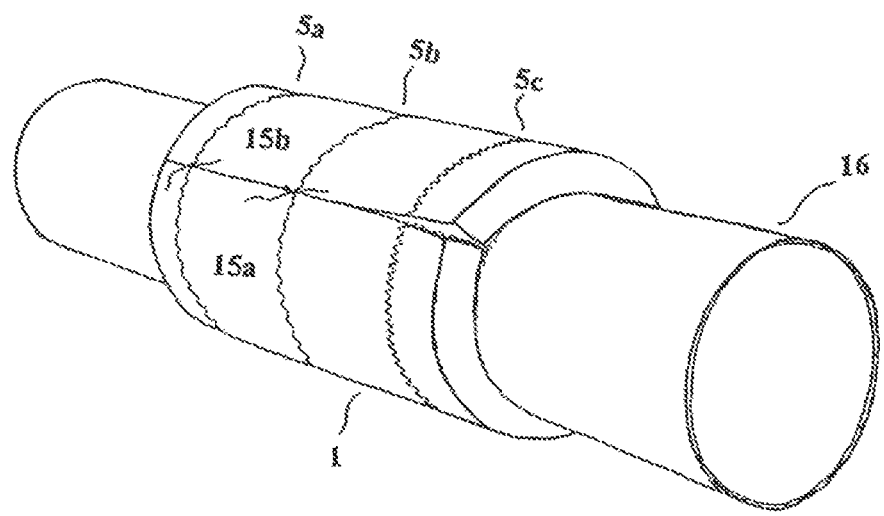
FIG. 5 shows how a wired mat according to FIG. 4 is mounted on a pipe as insulation material.

FIG. 5 shows how a wired mat according to FIG. 4 is mounted on a pipe as insulation material.

FIG. 5 illustrates an embodiment of the insulating product according to the invention mounted on a pipe 16, where the product comprising insulating layer 1 is adapted to fit the circumference of pipe 16 and fixation means 5a and 5b extending around the mounted product secures the product on the pipe 16 by knots 15a and 15b. The fixation means 5c has not yet been extended to protrude beyond the adjoining end surfaces of the product to enable the fixation thereby.

In one embodiment the mineral wool product has a water absorption according to ASTM C1763-16 of less than 4.0 vol. %, such as less than 2.0 vol. %, such as less than 1.5 vol. %.

In one embodiment the mineral wool product has a water absorption according to EN13472 of less than 1.0 kg/m2, such as less than 0.8 kg/m2, such as less than 0.5 kg/m2, such as less than 0.3 kg/m2.

In one embodiment the mineral wool product has water absorption according to EN13472 of less than 1.0 kg/m2, such as less than 0.8 kg/m2, such as less than 0.5 kg/m2, such as less than 0.3 kg/m2, following storage of the mineral wool product at 250° C. for 24 hours.

In this embodiment, in which the water absorption according to EN13472 is measured following storage of the mineral wool product at 250° C. for 24 hours, the following protocol for exposing the product to 250° C. for 24 hours is followed:

Pre-heat a laboratory furnace to 250° C. which is placed under a fume hood.

Place the samples in the furnace for a period of 24 hours.

The ventilation of the furnace shall be off, except from the last 30 minutes of the heating when the ventilation shall be on in order to remove fumes from the furnace in a safe way.

Remove the samples from the furnace and let them cool down to ambient temperature.

After that proceed with the requested test program for water absorption.

In one embodiment, the mineral wool product according to the present invention has a density of 20 to 150 kg/m3, such as 40 to 130 kg/m3, such as 60-120 kg/m3.

Method for Producing a Mineral Wool Product

The present invention is also directed to a method for producing a mineral wool product which comprises the steps of contacting mineral fibers with a binder composition comprising a phenol-formaldehyde-based resin, and/or a carbohydrate-containing component, and a hydrophobic agent comprising (i) at least one silicone compound, such as silicone resin, such as a reactive silicone resin, such as a reactive silicone resin chosen from the group of polyalkylethoxysiloxane, polymethylethoxysiloxane, polyphenylethoxysiloxane, polyphenylsiloxane, polyphenylmethylsiloxane, (ii) at least one hardener, such as silane, such as alkyltriethoxysilane, such as octyltriethoxysilane, (iii) at least one emulsifier.

In one embodiment, the hydrophobic agent comprises component (i) in an amount of 20 to 90 percent by weight, in particular 30 to 60 percent by weight, based on the weight of the hydrophobic agent.

In one embodiment, the hydrophobic agent comprises component (i) in form of polymethylethoxysiloxane.

In one embodiment, the hydrophobic agent comprises component (ii) in an amount of 0.5 to 10 percent by weight, in particular 1 to 5 percent by weight, based on the total weight of the hydrophobic agent.

In one embodiment, the hydrophobic agent comprises component (ii) in form of octyltriethoxysilane.

In an alternative embodiment, the silicone compound component (i) also serves as the hardener component (ii) of the hydrophobic agent. Accordingly, in this alternative embodiment, the hydrophobic agent comprises at least one silicone compound, such as silicone resin, such as a reactive silicone resin, such as a reactive silicone resin chosen from the group of polyalkylethoxysiloxane, polymethylethoxysiloxane, polyphenylethoxysiloxane, polyphenylsiloxane, polyphenylmethylsiloxane, and at least one emulsifier.

Accordingly, in one embodiment, the hardener is another compound than the silicone compound. In an alternative embodiment, the hardener is comprised in the silicone compound as a curable system. In this alternative embodiment, the hardener may be the feature that is effected by an intra-molecular hardening of the silicone compound.

In one embodiment, the hydrophobic agent comprises (i) in an amount of 30 to 60 percent by weight, (ii) in an amount of 1 to 5 percent by weight, based on the total weight of the hydrophobic agent, the remainder being (iii) and optionally other components and trace amounts of ethanol.

In one embodiment, the hydrophobic agent comprises polymethylethoxysiloxane in an amount of 30 to 60 percent by weight, octyltriethoxysilane in an amount of 1 to 5 percent by weight, based on the total weight of the hydrophobic agent, the remainder being (iii) and optionally other components and trace amounts of ethanol.

In one embodiment, the mineral wool product comprises the hydrophobic agent in an amount of 0.05 to 2 percent by weight, such as 0.10 to 1 percent by weight, such as 0.15 to 0.8 percent by weight, based on the weight of the mineral wool product.

In one embodiment, the binder composition comprises a carbohydrate-containing binder component, wherein the binder composition further comprises (a) a polycarboxylic acid component or any salt thereof and/or an inorganic acid or any salt thereof, and/or (b) a component selected from the group of amine compounds, ammonia, and optionally, and/or (c) a reaction product of a polycarboxylic acid component or anhydride thereof and an alkanolamine component.

In one embodiment the method is a method for producing a mineral wool product in form of an insulation product for thermal insulation of metallic surfaces structures.

In one embodiment the method is a method for producing a mineral wool product in form of a pipe section or a mat or wired mat.

To sum up, the present invention provides the following items:

1 The use of a mineral wool product comprising mineral fibers bound by a binder resulting from the curing of a binder composition comprising
  a phenol-formaldehyde-based resin, and/or a carbohydrate containing component;
  a hydrophobic agent comprising:
  (i) at least one silicone compound, such as silicone resin, such as a reactive silicone resin, such as a reactive silicone resin chosen from the group of polyalkylethoxysiloxane, polymethylethoxysiloxane, polyphenylethoxysiloxane, polyphenylsiloxane, polyphenylmethylsiloxane;
  (ii) at least one hardener, such as silane, such as alkyltriethoxysilane, such as octyltriethoxysilane;
  (iii) optionally, at least one emulsifier;
  as insulation of a metallic structure, said structure having an operating temperature between 0-650° C., such as between 25-500° C., such as between 70-300° C., such as between 300-650° C.

2. The use according to item 1, wherein the hydrophobic agent comprises (i) in an amount of 20 to 90 percent by weight, in particular 30 to 60 percent by weight, based on the weight of the hydrophobic agent.

3. The use according to item 1 or 2, wherein the hydrophobic agent comprises (ii) in an amount of 0.5 to 10 percent by weight, in particular 1 to 5 percent by weight, based on the total weight of the hydrophobic agent.

4. The use according to any one of the preceding items, wherein the hydrophobic agent comprises (i) in an amount of 30 to 60 percent by weight, (ii) in an amount of 1 to 5 percent by weight, based on the total weight of the hydrophobic agent, the remainder being (iii) and optionally other components and trace amounts of ethanol.

5. The use according to any one of the preceding items, wherein the hydrophobic agent comprises polymethylethoxysiloxane in an amount of 30 to 60 percent by weight, octyltriethoxysilane in an amount of 1 to 5 percent by weight, based on the total weight of the hydrophobic agent, the remainder being (iii) and optionally other components and trace amounts of ethanol.

6. The use according to any one of the preceding items, wherein the mineral wool product comprises the hydrophobic agent in an amount of 0.05 to 2 percent by weight, such as 0.10 to 1 percent by weight, such as 0.15 to 0.8 percent by weight, based on the weight of the mineral wool product.

7 The use according to any one of the preceding items, wherein the binder composition comprises a carbohydrate-containing binder component, wherein the binder composition further comprises
  (a) a polycarboxylic acid component or any salt thereof and/or an inorganic acid or any salt thereof, and/or
  (b) a component selected from the group consisting of amine compounds, ammonia; and optionally, and/or
  (c) a reaction product of a polycarboxylic acid component or anhydride thereof and an alkanolamine component.

8. The use according to any one of the preceding items, wherein the mineral wool product is a pipe section or a mat or wired mat.
9. A binder composition for mineral fibers comprising:
   a phenol-formaldehyde-based resin, and/or a carbohydrate-containing component; and
   a hydrophobic agent comprising:
   (i) at least one silicone compound, such as silicone resin, such as a reactive silicone resin, such as a reactive silicone resin chosen from the group of polyalkylethoxysiloxane, polymethylethoxysiloxane, polyphenylethoxysiloxane, polyphenylsiloxane, polyphenylmethylsiloxane;
   (ii) at least one hardener, such as silane, such as alkyltriethoxysilane, such as octyltriethoxysilane;
   (iii) optionally, at least one emulsifier.
10. The binder composition according to item 9, wherein the hydrophobic agent comprises (i) in an amount of 20 to 90 percent by weight, in particular 30 to 60 percent by weight, based on the weight of the hydrophobic agent.
11. The binder composition according to item 9 or 10, wherein the hydrophobic agent comprises (ii) in an amount of 0.5 to 10 percent by weight, in particular 1 to 5 percent by weight, based on the total weight of the hydrophobic agent.
12. The binder composition according to any one of items 9 to 11, wherein the hydrophobic agent comprises (i) in an amount of 30 to 60 percent by weight, (ii) in an amount of 1 to 5 percent by weight, based on the total weight of the hydrophobic agent, the remainder being (iii) and optionally other components and trace amounts of ethanol.
13. The binder composition according to any one of the items 9 to 12, wherein the hydrophobic agent comprises polymethylethoxysiloxane in an amount of 30 to 60 percent by weight, octyltriethoxysilane in an amount of 1 to 5 percent by weight, based on the total weight of the hydrophobic agent, the remainder being (iii) and optionally other components and trace amounts of ethanol.
14. The binder composition according to any one of the items 9 to 13, wherein the binder composition comprises a carbohydrate-containing binder component, wherein the binder composition further comprises
   (a) a polycarboxylic acid component or any salt thereof and/or an inorganic acid or any salt thereof, and/or
   (b) a component selected from the group consisting of amine compounds, ammonia; and optionally, and/or
   (c) a reaction product of a polycarboxylic acid component or anhydride thereof and an alkanolamine component.
15. A mineral wool product comprising mineral fibers bound by a binder resulting from the curing of a binder composition comprising
   a phenol-formaldehyde-based resin, and/or a carbohydrate-containing component;
   a hydrophobic agent comprising:
   (i) at least one silicone compound, such as silicone resin, such as a reactive silicone resin, such as a reactive silicone resin chosen from the group of polyalkylethoxysiloxane, polymethylethoxysiloxane, polyphenylethoxysiloxane, polyphenylsiloxane, polyphenylmethylsiloxane;
   (ii) at least one hardener, such as silane, such as alkyltriethoxysilane, such as octyltriethoxysilane;
   (iii) optionally, at least one emulsifier.
16. The mineral wool product according to item 15, wherein the hydrophobic agent comprises (i) in an amount of 20 to 90 percent by weight, in particular 30 to 60 percent by weight, based on the weight of the hydrophobic agent.
17. The mineral wool product according to item 15 or 16, wherein the hydrophobic agent comprises (ii) in an amount of 0.5 to 10 percent by weight, in particular 1 to 5 percent by weight, based on the total weight of the hydrophobic agent.
18. The mineral wool product according to any one of items 15 to 17, wherein the hydrophobic agent comprises (i) in an amount of 30 to 60 percent by weight, (ii) in an amount of 1 to 5 percent by weight, based on the total weight of the hydrophobic agent, the remainder being (iii) and optionally other components and trace amounts of ethanol.
19. The mineral wool product according to any one of items 15 to 18, wherein the hydrophobic agent comprises polymethylethoxysiloxane in an amount of 30 to 60 percent by weight, octyltriethoxysilane in an amount of 1 to 5 percent by weight, based on the total weight of the hydrophobic agent, the remainder being (iii) and optionally other components and trace amounts of ethanol.
20. The mineral wool product according to any one of items 15 to 19, wherein the mineral wool product comprises the hydrophobic agent in an amount of 0.05 to 2 percent by weight, such as 0.10 to 1 percent by weight, such as 0.15 to 0.8 percent by weight, based on the weight of the mineral wool product.
21. The mineral wool product according to any one of items 15 to 20, wherein the binder composition comprises a carbohydrate-containing binder component, wherein the binder composition further comprises
   (a) a polycarboxylic acid component or any salt thereof and/or an inorganic acid or any salt thereof, and/or
   (b) a component selected from the group consisting of amine compounds, ammonia; and optionally, and/or
   (c) a reaction product of a polycarboxylic acid component or anhydride thereof and an alkanolamine component.
22. The mineral wool product according to any one of items 15 to 21, in the form of an insulation product for thermal insulation of metallic structures.
23. The mineral wool product according to any one of items 15 to 22, in the form of a pipe section or a mat or wired mat.
24. The mineral wool product according to any one of items 15 to 23, having a water absorption according to ASTM C1763-16 of less than 4.0 vol. %, such as less than 2.0 vol. %, such as less than 1.5 vol. %.
25. The mineral wool product according to any one of items 15 to 24, having a water absorption according to EN13472 of less than 0.5 kg/m$^2$, such as less than 0.3 kg/m$^2$.
26. The mineral wool product according to any one of items 15 to 25, having a water absorption according to EN13472 of less than 1.0 kg/m$^2$, such as less than 0.8 kg/m$^2$, such as less than 0.5 kg/m$^2$, such as less than 0.3 kg/m$^2$, following storage of the mineral wool product at 250° C. for 24 hours.
27. A method for producing a mineral wool product which comprises the steps of contacting mineral fibers with a binder composition comprising
   a phenol-formaldehyde-based resin, and/or a carbohydrate-containing component; and
   a hydrophobic agent comprising:
   (i) at least one silicone compound, such as silicone resin, such as a reactive silicone resin, such as a reactive silicone resin chosen from the group of polyalkylethoxysiloxane, polymethylethoxysiloxane, polyphenylethoxysiloxane, polyphenylsiloxane, polyphenylmethylsiloxane;
(ii) at least one hardener, such as silane, such as alkyltriethoxysilane, such as octyltriethoxysilane;
(iii) optionally, at least one emulsifier.
28. The method for producing a mineral wool product according to item 27, wherein the hydrophobic agent comprises (i) in an amount of 20 to 90 percent by weight, in particular 30 to 60 percent by weight, based on the weight of the hydrophobic agent.
29. The method for producing a mineral wool product according to item 27 or 28, wherein the hydrophobic agent comprises (ii) in an amount of 0.5 to 10 percent by weight, in particular 1 to 5 percent by weight, based on the total weight of the hydrophobic agent.
30. The method for producing a mineral wool product according to any one of items 27 to 29, wherein the hydrophobic agent comprises (i) in an amount of 30 to 60 percent by weight, (ii) in an amount of 1 to 5 percent by weight, based on the total weight of the hydrophobic agent, the remainder being (iii) and optionally other components and trace amounts of ethanol.
31. The method for producing a mineral wool product according to any one of items 27 to 30, wherein the hydrophobic agent comprises polymethylethoxysiloxane in an amount of 30 to 60 percent by weight, octyltriethoxysilane in an amount of 1 to 5 percent by weight, based on the total weight of the hydrophobic agent, the remainder being (iii) and optionally other components and trace amounts of ethanol.
32. The method for producing a mineral wool product according to any one of items 27 to 31, wherein the mineral wool product comprises the hydrophobic agent in an amount of 0.05 to 2 percent by weight, such as 0.10 to 1 percent by weight, such as 0.15 to 0.8 percent by weight, based on the weight of the mineral wool product.
33. The method for producing a mineral wool product according to any one of items 27 to 32, wherein the binder composition comprises a carbohydrate-containing binder component, wherein the binder composition further comprises
(a) a polycarboxylic acid component or any salt thereof and/or an inorganic acid or any salt thereof, and/or
(b) a component selected from the group consisting of amine compounds, ammonia; and optionally, and/or
(c) a reaction product of a polycarboxylic acid component or anhydride thereof and an alkanolamine component.
34. The method for producing a mineral wool product according to any one of items 27 to 33, in form of an insulation product for thermal insulation of metallic structures.
35. The method for producing a mineral wool product according to any of items 27 to 34, in form of a pipe section or a mat or wired mat.

The present invention is further illustrated by the following examples:

Examples

Different insulation products were tested with regard to water absorption properties according to the standard ASTM C1763-16 test method.

The results of tests are stated in Table 1 below. In Table 1, Roxul® is stone wool insulation, Roxul® SL960 is a stone wool insulation board, and Roxul® PS980 is a stone wool, mandrel would pipe section.

TABLE 1

| Sample | Density kg/m$^3$ | Volume cm$^3$ | Mass, initial g | Mass, after immersion (2 hr) g | Mass, recondition (after 48 hr) g | Water Abs. (WA) vol. % | Recovery WA, 2 hr vol. % | Recovery WA, 48 hr vol. % |
|---|---|---|---|---|---|---|---|---|
| Roxul ® SL960, mat | 92 | 4532 | 415.69 | 658.47 | 415.82 | 5.4 | 4.9 | 0.003 |
| E-glass, pipe section | 234 | 2755 | 646.09 | 3166.03 | 2599.29 | 22.9 | 22.6 | 17.73 |
| Roxul ®, Pipe section with SILRES ® BS45 | 73 | 2162 | 158.14 | 183.88 | 158.93 | 1.2 | 0.5 | 0.037 |
| Mineral wool, pipe section | 145 | 2427 | 350.88 | 832.86 | 438.04 | 5.0 | 4.8 | 0.898 |
| Roxul ® PS980, pipe section | 183 | 1776 | 325.90 | 806.37 | 556.76 | 6.8 | 6.6 | 3.249 |
| Mineral wool, mat | 80 | 7582 | 606.86 | 2040.20 | 1269.98 | 18.9 | 18.2 | 8.746 |

Pipe sections were tested with regard to water absorption properties according to the standard EN13472. The pipe sections were manufactured as a mandrel wound pipe section and are from the ProRox product series and the tested specimen had a thickness of 50 mm.

The tests were done on both untreated products and products that were aged (250° C./24 h).

SILRES® BS 45 silicon resin from Wacker had been added to the products in amount of 0.41 wt. %.

The results from a triple-determination are stated in Table 2. ProRox® 960 is a stone wool pipe section.

TABLE 2

| | | | | | | | | |
|---|---|---|---|---|---|---|---|---|
| Roxul ® PS980, pipe section | 183 | 1776 | 325.90 | 806.37 | 556.75 | 6.8 | 6.6 | 3.249 |
| Mineral wool, mat | 80 | 7582 | 606.86 | 2040.20 | 1269.98 | 18.9 | 18.2 | 8.746 |

The entire disclosures of European patent applications 17188636.9 and 17188632.8, both filed on Aug. 30, 2017, ae expressly incorporated by reference herein.

That which is claimed is:
1. A mineral wool product comprising mineral fibers bound by a binder resulting from a curing of a binder composition for mineral fibers, wherein the binder composition comprises:
a phenol-formaldehyde-based resin; and
a hydrophobic agent comprising:
a silicone compound, and
a silane or an emulsifier;

wherein the hydrophobic agent is present at approximately 0.05 to 2 percent by weight of the mineral wool insulation product;
wherein the mineral wool product has a water absorption according to ASTM C1763-16 of less than 4.0 vol. percent, and/or following storage of the mineral wool product at 250 degrees centigrade for 24 hours, the mineral wool product has a water absorption according to EN13472 of less than 1.0 kg/m$^2$; and
wherein the mineral wool product has a density of 20 kg/m$^3$ to 150 kg/m$^3$.

2. The mineral wool product of claim 1, wherein the hydrophobic agent is in an amount of 0.1 to 1 percent by weight, based on a total weight of the mineral wool product.

3. The mineral wool product of claim 1, wherein the hydrophobic agent is in an amount of 0.15 to 0.8 percent by weight, based on a total weight of the mineral wool product.

4. The mineral wool product of claim 1, wherein the silicone compound comprises silicone resin.

5. The mineral wool product of claim 4, wherein the silicone resin comprises at least one of polyalkylethoxysiloxane, polyphenylethoxysiloxane, polyphenylsiloxane, or polyphenylmethylsiloxane.

6. The mineral wool product of claim 1, wherein the silane comprises an alkyltriethoxysilane.

7. The mineral wool product of claim 1, wherein the binder composition further comprises a carbohydrate-containing component and a polycarboxylic acid component.

8. The mineral wool product of claim 1, wherein the binder composition further comprises a carbohydrate-containing component and at least one of ammonia or an amine compound.

9. The mineral wool product of claim 1, wherein the binder composition further comprises a carbohydrate-containing component and a reaction product of polycarboxylic acid anhydride and an alkanolamine component.

10. The mineral wool product of claim 1, wherein the mineral wool product has a density in a range of 40 kg/m$^3$ to 130 kg/m$^3$.

11. The mineral wool product of claim 1, wherein the mineral wool product is at least one of a pipe section, a mat, or a wired mat.

12. The mineral wool product of claim 1, wherein, following storage of the mineral wool product at 250 degrees centigrade for 24 hours, the water absorption of the mineral wool product according to EN13472 is less than 0.5 kg/m$^2$.

13. The mineral wool product of claim 1, wherein, following storage of the mineral wool product at 250 degrees centigrade for 24 hours, the water absorption of the mineral wool product according to EN13472 is less than 0.3 kg/m$^2$.

14. The mineral wool product of claim 1, wherein the mineral wool product has a density in a range of 60 kg/m$^3$ to 120 kg/m$^3$.

15. A mineral wool insulation product comprising:
mineral fibers;
a cured binder composition comprising a phenol-formaldehyde-based resin, wherein the cured binder composition binds the mineral fibers; and
a hydrophobic agent comprising a silicone compound and a hardener and/or an emulsifier, wherein the hydrophobic agent is present at approximately 0.1 to 1 percent by weight of the mineral wool insulation product;
wherein the mineral wool product has a water absorption according to ASTM C1763-16 of less than 4.0 vol. percent and/or a water absorption according to EN13472 of less than 1.0 kg/m$^2$ following storage of the mineral wool product at 250 degrees centigrade for 24 hours; and
wherein the mineral wool product has a density of 20 kg/m$^3$ to 150 kg/m$^3$.

16. The mineral wool product of claim 15, wherein the hydrophobic agent is in an amount of 0.1 to 1 percent by weight, based on a total weight of the mineral wool product.

17. The mineral wool product of claim 15, wherein the hydrophobic agent is in an amount of 0.15 to 0.8 percent by weight, based on a total weight of the mineral wool product.

18. The mineral wool product of claim 15, wherein the silicone compound comprises silicone resin.

19. The mineral wool product of claim 15, wherein the mineral wool product has a density in a range of 40 kg/m$^3$ to 130 kg/m$^3$.

20. The mineral wool product of claim 15, wherein the mineral wool product has a density in a range of 60 kg/m$^3$ to 120 kg/m$^3$.

* * * * *